United States Patent
Baaren

(10) Patent No.: US 7,466,626 B2
(45) Date of Patent: Dec. 16, 2008

(54) SEISMIC SURVEYING ARRANGEMENT

(75) Inventor: Peter Van Baaren, Dubai (AE)

(73) Assignee: WesternGeco L.L.C., Houston, TX (US)

( * ) Notice: Subject to any disclaimer, the term of this patent is extended or adjusted under 35 U.S.C. 154(b) by 129 days.

(21) Appl. No.: 10/543,321

(22) PCT Filed: Jan. 23, 2004

(86) PCT No.: PCT/EP2004/050037

§ 371 (c)(1),
(2), (4) Date: May 1, 2006

(87) PCT Pub. No.: WO2004/068171

PCT Pub. Date: Aug. 12, 2004

(65) Prior Publication Data

US 2006/0262645 A1 Nov. 23, 2006

(30) Foreign Application Priority Data

Jan. 31, 2003 (GB) ............................ 0302232.4

(51) Int. Cl.
*G01V 1/20* (2006.01)
(52) U.S. Cl. .................. 367/54; 367/57; 181/111; 181/112
(58) Field of Classification Search .................. 367/38, 367/54, 57; 181/111, 112
See application file for complete search history.

(56) References Cited

U.S. PATENT DOCUMENTS

| | | | |
|---|---|---|---|
| 2,154,548 A * | 4/1939 | Weatherby | ............... 367/56 |
| 2,992,694 A | 7/1961 | Musgrave et al. | |
| 3,012,625 A | 12/1961 | Piety | |
| 3,195,676 A * | 7/1965 | Eisler et al. | ............... 367/57 |
| 4,497,044 A * | 1/1985 | Silverman | ............... 367/57 |
| 4,695,984 A * | 9/1987 | Paal | ............... 367/54 |
| 4,958,328 A | 9/1990 | Stubblefield | |

(Continued)

OTHER PUBLICATIONS

Schneider, "A new data-processing technique for the elimination of ghost arrivals on reflection seismograms," Geophysics, DEG, XXIX(5):783-805, 1964.

(Continued)

*Primary Examiner*—Ian J Lobo
(74) *Attorney, Agent, or Firm*—Ari Pramudji; Liangang (Mark) Ye; Jeffrey E. Griffin

(57) ABSTRACT

A seismic surveying arrangement comprises a vertical source array (26) having at least two sources (27,28) of seismic energy. The source array (26) is disposed such that a first source (28) is located within a weathered layer (35) of the earth's interior and such that a second source (27) is located within the weathered layer at a greater depth than the first source or within a high velocity layer (8) underlying the weathered layer (35). The surveying arrangement also includes a first horizontal receiver array (29) located in the weathered layer, and means for processing seismic data acquired by the first receiver array. The processing means are able to process the acquired seismic data so as to attenuate seismic events involving reflection of seismic energy at at least one boundary face of the high velocity layer. The seismic surveying arrangement may also comprise a second receiver array (30) disposed at a lower depth than the first receiver array (29). Wavefield separation techniques may then be applied at both the receiver side and the source side.

17 Claims, 5 Drawing Sheets

U.S. PATENT DOCUMENTS 5,253,217 A    10/1993   Justice, Jr. et al.
5,581,514 A    12/1996   Moldoveanu et al.
6,757,616 B1 *  6/2004   Emmons et al. .............. 702/18
6,894,949 B2 *  5/2005   Aronstam .................... 367/57

OTHER PUBLICATIONS

UK Search Report dated Apr. 24, 2003 for Application No. GB 0302232.4.

* cited by examiner

SEISMIC SURVEYING ARRANGEMENT

The present invention relates to a seismic surveying arrangement, and in particular to a seismic surveying arrangement for use at a survey location where a high velocity layer exists at or near the earth's surface.

Various methods are known for obtaining seismic profiles at a desired survey location on land One such known method is the vertical seismic profile (VSP), which is illustrated in FIG. 1.

FIG. 1 shows a VSP seismic surveying arrangement denoted generally as 1 that is intended to provide information about a target geological structure within the earth. In the case of FIG. 1 the target geological structure is a boundary 11 between one layer 10 and another layer 12 of the earth's interior. A source 7 of seismic energy is disposed on or below the earth's surface 3, and a plurality of seismic receivers 5 are disposed at vertically spaced locations within a borehole 2 which typically has a depth of the order of several thousand feet. Each receiver comprises one or more seismic sensing elements such as accelerometers or geophones (or hydrophones in the event that the borehole is filled with liquid). Signals received by the sensors are sent to monitoring/recording means 9.

When the seismic source 7 is actuated to emit seismic energy, seismic energy will travel to the receivers 5 along many paths. The most important paths, from the viewpoint of obtaining an accurate seismic profile of the survey location, are the primary paths P1-P5. Seismic energy that travels along one of the primary paths travels downwards into the earth, undergoes a single reflection at a target geological structure (i.e., the boundary 11), and is then incident on one of the receivers 5.

One problem encountered in processing seismic data is that many other seismic energy paths exist in addition to the primary paths P1-P5. For example, when the seismic source 7 is actuated, seismic energy may travel direct from the source 7 to one of the receivers 5. One such "direct" path is indicated in FIG. 1 as D1. Seismic energy that travels along a direct path gives rise to a "direct event" in the signal acquired by a receiver. A direct event is unlikely to be confused with a primary event, since the travel time along a direct path is normally less than the travel time along a primary path, so that a direct event does not normally obscure a primary event. Indeed, a direct event may be of use for timing purposes.

Further paths of seismic energy exist that involve reflection at the earth's surface 3. For example, seismic energy that is initially emitted downwards by the source may be reflected upwards, either at the boundary 11 or at another interface (not shown) within the earth's interior. Such upward-going seismic energy may travel upwards all the way to the earth's surface 3 where it reflected downwards, and may then be detected by a receiver 5. A portion of a path involving reflection at the earth's surface is indicated schematically as R1 in FIG. 1.

A further problem encountered in seismic surveying is that the seismic properties of the earth are not uniform. In particular, a layer in which the velocity of seismic energy is significantly higher than in the underlying layers 10,12 may exist at or near the earth's surface. This high velocity layer is indicated schematically by the layer 8 in FIG. 1. A layer of soil and/or weathered rock may constitute such a high velocity layer, as may layers of surface limestone or basalt. There is a large change in acoustic impedance at the interface 24 between the high velocity layer 8 and the layer 10, so that the interface has a high reflectivity. Down-going seismic energy from the source 7 may undergo partial reflection at the interface between the high velocity layer 8 and the underlying layer 10, and this gives rise to further paths of seismic energy such as the path R2 in FIG. 1. Events that arise from seismic energy paths involving reflection at the lower boundary of the high velocity layer 8 may obscure the primary events. In addition to the path R2, paths also exist that involve reflection both at the earth's surface and at the lower face of the layer 8, and so involve multiple passes through the high velocity layer 8, and these paths are generally known as "reverberations".

In FIG. 1 the high velocity layer 24 is shown as extending to the earth's surface. It is possible, however, for the high velocity layer 8 to be covered by an overlying layer of heavily weathered rock (not shown in FIG. 1). Indeed, at some survey locations the high velocity layer 8 is covered by more than one such overlying "weathered layers". The seismic properties of the weathered layer or layers may be different from the seismic properties of the underlying layers.

When the seismic data acquired by the receivers 5 are processed, it is necessary to distinguish between events arising from seismic energy that has travelled along a primary path P1-P5 and events arising from seismic energy that has travelled along other paths.

As is clear from FIG. 1, seismic energy travelling along a primary path P1-P5 is travelling upwards when incident on a receiver. Seismic energy travelling along the path R1, or along any other path which involves reflection at the earth's surface as the last reflection before arrival at a receiver, is however travelling downwards at the receiver. As disclosed in, for example, U.S. Pat. No. 4,958,328, the vertical arrangement of sensors in a VSP seismic surveying arrangement allows up-going and down-going waves to be distinguished from one another during processing of the data. Thus, the effect of the reverberations on the seismic data may be reduced by separating the seismic data into its up-going and down-going constituents. The VSP method is therefore well suited for obtaining seismic profiles in the vicinity of an existing borehole. It is, however, severely limited in the horizontal direction, because its effectiveness decreases rapidly as the source 7 is moved away from the borehole 2. It is also limited in that the method cannot be carried out if there is no borehole at the desired survey location.

The VSP method may also be applied in the marine environment. Indeed, the VSP method can be used to advantage in water, because a borehole is no longer required for the vertically stacked receivers. FIG. 2 shows a typical marine VSP seismic surveying arrangement as disclosed in U.S. Pat. No. 4,958,328.

As shown in FIG. 2, receivers 5 can be suspended vertically in water from a buoy 13. A seismic source 7 is suspended below sea surface, for example from a survey vessel 14. Seismic data acquired by the receivers 5 is relayed to a monitor (not shown) by any convenient means. This may be done, for example, by means of a transmitter 13A located on the buoy 13, or it may be done by means of a fixed electrical or optical link. When the seismic source 7 is actuated to emit seismic energy, energy is transmitted downwards, and some will penetrate into the sea-bed, undergo partial reflection at a target geological structure (such as the boundary 11) within the sea-bed, and be reflected back to the receivers 5. Such a desired primary path is indicated as P1 in FIG. 2. In addition to this desired path, however, many other paths of seismic energy exist. One interfering path is indicated as path R1, and it will be seen that this involves one reflection at the sea-floor 15 and one reflection at the sea-surface 19. Seismic energy that travels along this path is incident on the receivers 5 as a down-going wave, and generates what is known as a "sensor ghost reflection". The path R1 is only one example of a path that involves multiple reflections between the source 7 and a receiver 5. Many other multiple reflection paths exist, involving reflection at the sea-surface 19, the sea-floor 15 and/or the boundary 11. All of these multiple reflected signals interfere with the primary signals, and thus reduce the accuracy of the data obtained.

FIG. 3 is a schematic illustration of another conventional seismic surveying arrangement. In this arrangement the receivers 5 are separated from one another in the horizontal direction, and the arrangement of FIG. 3 is therefore known as a horizontal seismic profile (HSP) seismic surveying arrangement.

In the HSP seismic surveying arrangement 6 of FIG. 3, the receivers 5 are disposed at horizontally spaced locations on the earth's surface 3. A seismic source 7 is also disposed on the earth's surface, horizontally separated from each receiver. When the seismic source is actuated, seismic energy is emitted downwards into the earth, undergoes reflection at a target geological structure (in this case, the boundary 11), and the up-going reflected energy is incident on the receivers 5. The primary paths of seismic energy that involve a single reflection at the boundary 11 are denoted by P1, P2 and P3 in FIG. 3. The HSP seismic surveying arrangement has the advantage that the source 7 and/or the receivers 5 may be moved relatively easily along the earth's surface, and this allows the survey location, or the area surveyed, to be changed. However, all seismic energy incident on a receiver 5 in a HSP seismic surveying arrangement is travelling upwards. It is therefore very difficult to distinguish between, on the one hand, seismic energy that has been received along a primary path and, on the other hand, seismic energy that has, for example, been reflected at the lower boundary face of a high velocity layer (not shown in FIG. 3), or that has travelled along a path that involves multiple reflections such as the path indicated as R1 (along which seismic energy initially undergoes reflection at the boundary 11, is then reflected downwards at the earth's surface 3, and undergoes a further reflection at the boundary 11 before being incident upon a receiver). It is therefore difficult to obtain accurate data using a HSP seismic surveying arrangement at a survey location where a high velocity layer is present at or near the earth's surface.

FIG. 4 illustrates a further known seismic surveying arrangement, as disclosed in U.S. Pat. No. 5,581,514. This seismic surveying arrangement is used in the land-sea transition zone, which is the area between land and deep water. As with the marine VSP seismic surveying arrangement 4 of FIG. 2, the seismic surveying arrangement 18 of FIG. 4 again uses two or more vertically separated receivers 5 suspended in a water column from a buoy 13. A seismic source 7 is disposed beneath the surface 19 of the water column, and may be either within the water column 16 or in a layer 15 of mud that overlays the rock layers 10, 12. The seismic data acquired at the vertically separated receivers are relayed to monitoring/recording means 9 and subsequently processed in order to remove events arising from reflections from the boundary 23 between the water column 16 and the mud layer 15. Although the receivers 5 are shown disposed in the water column 16 in FIG. 4, they could alternatively be disposed within the mud layer 15. This method is therefore unsuitable for use on dry land, since a uniform homogenous layer such as a layer of water or a layer of mud are typically not found in dry-land survey locations.

FIG. 5 is a schematic illustration of a further seismic surveying arrangement 20 known from U.S. Pat. No. 5,581,514. This is again intended for use in the land-sea transition zone. As with the seismic surveying arrangement of FIG. 4, it uses vertically separated receivers 25U, 25L, located in either a water column 16 or a mud layer 15 (in FIG. 5 the receivers are shown in the mud layer 15). Seismic data acquired by the receivers are relayed to monitoring/recording means 9, for example by means of transmitters 13A disposed on the buoys 13 from which the receivers 25U,25L are suspended.

The seismic surveying arrangement 17 of FIG. 5 comprises a seismic source. This may be suspended in the water column at position 33, for example from a survey vessel (not shown). Alternatively, the source may be disposed at position 34 within the mud layer 15. Seismic data acquired by the receivers 25U, 25L are again separated into up-going and down-going constituents in order to identify the primary events and reduce the effect of events that tend to obscure the primary events.

FIG. 6 is a plan view of the seismic surveying arrangement 20 of FIG. 5. The receivers are arranged in an array that extends in both the x- and y-directions, with the spacing between neighbouring receivers being Dx in the x-direction and Dy in the y-direction. Measurements are initially taken with the source in a first position, such as position A. The source is then moved in the x-direction across the receiver array to position B, and measurements are again taken. The source is then moved in the y-direction to position C, and measurements are again taken. Finally, the source is moved in the x-direction back across the receiver array to position D, and measurements are again taken.

The seismic surveying arrangement 17 of FIGS. 5 and 6 is specifically for the land/sea transition zone and again requires that the seismic sources and the seismic receivers are disposed in a water column or in a mud layer. The seismic surveying arrangement cannot therefore be used on dry-land.

None of the known seismic surveying arrangements is therefore suitable for use at an on-shore (dry-land) survey location where strong reverberations are present. Areas where strong reverberations are present are typically areas with rough surface topography and poor access. Furthermore, there is typically significant variation in conditions and coupling efficiency between sensors disposed at or near the earth's surface and the sensors buried within the earth, owing to the presence of layers of basalt or limestone at or near the earth's surface. Furthermore, a sensor buried within the earth will experience different noise levels from a sensor disposed on the earth's surface, as a sensor disposed within the earth is not subject to wind or rain noise. A further problem is that placing sources and sensors at these on-shore survey locations is typically very expensive compared to the marine case or the transition zone case.

A first aspect of the present invention provides a seismic surveying arrangement comprising: a vertical source array having at least two sources of seismic energy and disposed such that a first source is located within a weathered layer of the earth's interior and such that a second source is located within the weathered layer at a greater depth than the first source or within a high velocity layer underlying the weathered layer, a first horizontal receiver array located in the weathered layer; and means for processing seismic data acquired by the first receiver array in consequence of emission of seismic energy by the source array so as to attenuate in the acquired seismic data seismic events involving reflection of seismic energy at at least one boundary face of the high velocity layer.

A seismic surveying arrangement of the present invention contains at least two sources, one disposed above the other. It therefore provides improved seismic imaging, since wavefield separation techniques may be applied at the source side, and this reduces the effect of reverberations in the acquired seismic data.

In a preferred embodiment the seismic surveying arrangement further comprising a second horizontal receiver array located within the weathered layer at a greater depth than the first receiver array or within the high velocity layer underlying the weathered layer, wherein at least one receiver of the second receiver array is disposed substantially vertically below a receiver of the first receiver array. In this embodiment wavefield separation techniques may also be applied at the receiver side owing to the presence of two receivers, one disposed above the other.

If the weathered layer is deep enough, it is possible to dispose the sources and receivers in the weathered layer. At some survey locations, however, the weathered layer is not deep enough to allow this, so the lower source, and the lower receiver array if present, are located in the high velocity layer. The seismic properties of the weathered layer will be generally similar to those of the high velocity layer, so that the reverberation paths travelling through the weathered layer and the high velocity layer involve, to a reasonable approximation, only a single laterally varying velocity. In contrast, in the prior art seismic surveying arrangement of FIG. 5, for example, the upper source 28 is disposed in the water column 16 whereas the lower source 27 is disposed in the mud layer 15. The velocity of seismic energy in the water layer 16 will be significantly different from its velocity in the mud layer 15, and this complicates analysis of the acquired data.

Furthermore, the seismic velocity of the water layer 16 and the mud layer 15 in the prior art seismic surveying arrangement of FIG. 5 will show much less lateral variation than is the case for a weathered layer or a high velocity layer. The coupling of source and receivers to the surrounding layers will also be much more uniform in the water layer 16 and the mud layer 15 of the prior art arrangement of FIG. 5 than in a weathered layer or a high velocity layer. These variations in coupling and velocity must be taken into account during processing of the data.

The principle of the invention is that the surveying arrangement comprises vertically-separated sources, and possibly vertically-separated receivers, so that wavefield separation can take place. In general, it is most practical if sources and receivers are in the weathered layer above the high velocity layer. However, the invention can be applied with one source in the weathered layer and one source in the high velocity layer, and/or with one receiver array in the weathered layer and another receiver array in the high velocity layer, by allowing for the different coupling in the two layers when processing the data.

The present invention may be applied to any dry land survey location, including a permafrost location.

The uppermost seismic source of the vertical source array may be disposed substantially at or on an upper boundary face of the weathered layer, or it may be disposed within the weathered layer. The lowermost seismic source of the vertical source array may be disposed within the weathered layer or substantially at a lower boundary face of the weathered layer (if the weathered layer is deep enough to accommodate the sources) or within the high velocity layer or at a lower boundary face of the high velocity layer. Thus, if the weathered layer is deep enough, each source of the vertical source array may be disposed within the weathered layer.

The first receiver array may consist of only a single receiver, and the second receiver array may consist of only a single receiver. Alternatively, each receiver array may comprise two or more laterally spaced receivers.

The first receiver array may be disposed substantially at an upper boundary face of the weathered layer. Alternatively, it may be within the weathered layer. If provided, the second receiver array may be disposed within the weathered layer or substantially at a lower boundary face of the weathered layer (if the weathered layer is deep enough to accommodate two arrays), within the high velocity layer or at a lower boundary face of the high velocity layer.

The weathered layer may be the uppermost layer of the earth's interior. This is advantageous, since the upper boundary face of the weathered layer is then an interface with the atmosphere, and strong reflection of seismic energy will occur at the earth/air interface. The reverberations will therefore appear more strongly in the acquired seismic data and this makes it easier to remove the reverberations by appropriate processing. The invention is not however limited to the weathered layer being the uppermost layer of the earth's interior and there could be one or more layers overlying the weathered layer.

Preferred embodiments of the present invention will now be described by way of illustrative example with reference to the accompanying figures in which.

Like references refer to like components throughout the drawings.

Figure 1:
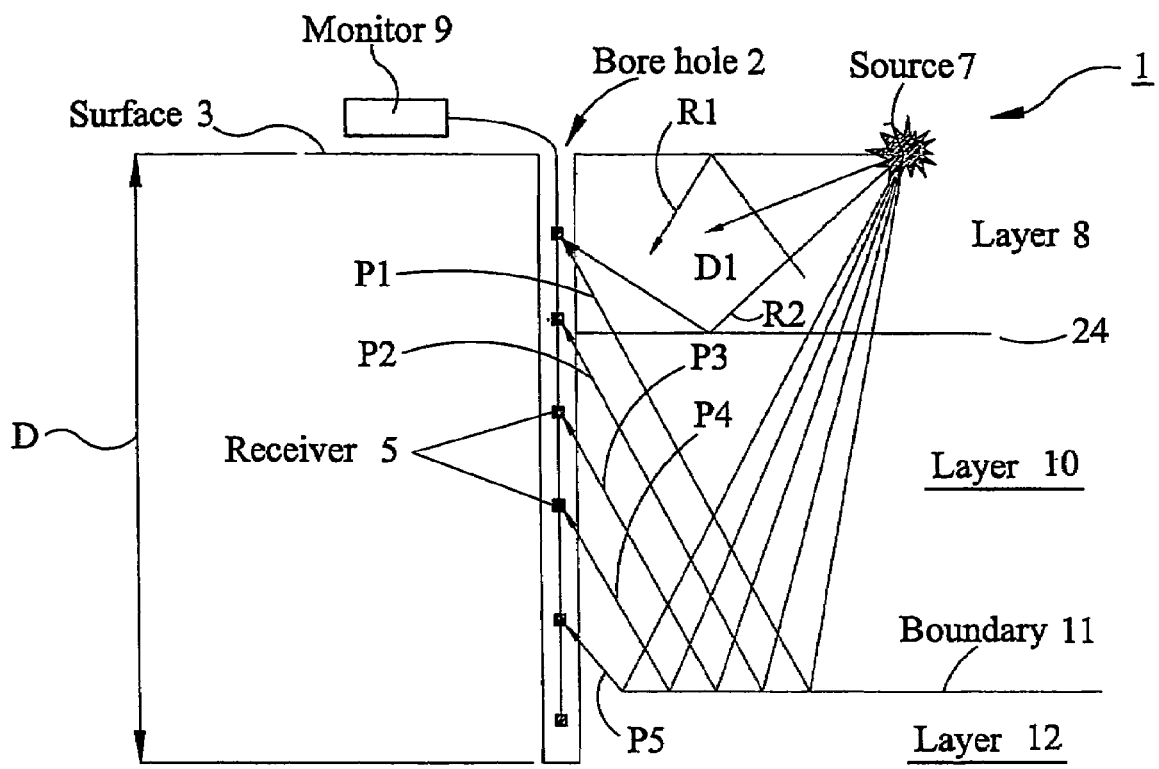
FIG. 1 is a schematic view of a prior art VSP seismic surveying arrangement.
Figure 2:
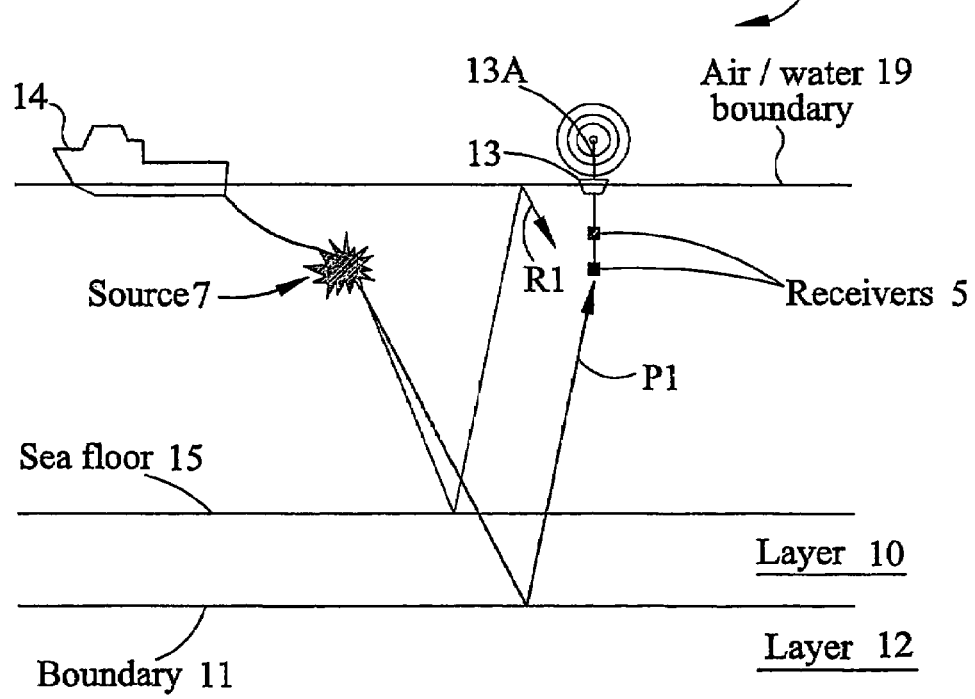
FIG. 2 is a schematic view of a prior art marine VSP seismic surveying arrangement.
Figure 3:
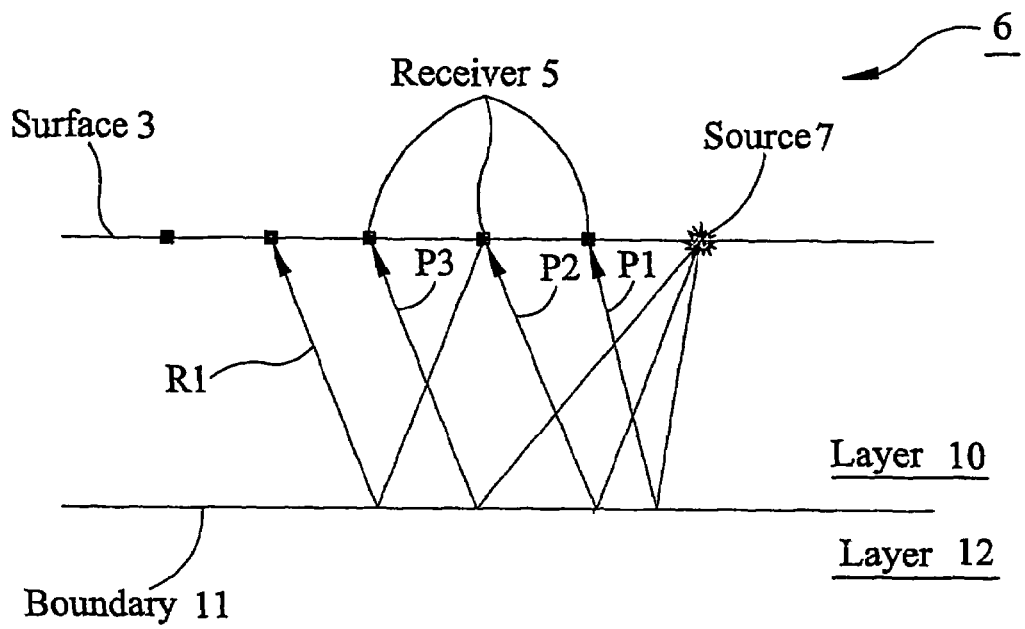
FIG. 3 is a schematic illustration of a known HSP seismic surveying arrangement.
Figure 4:
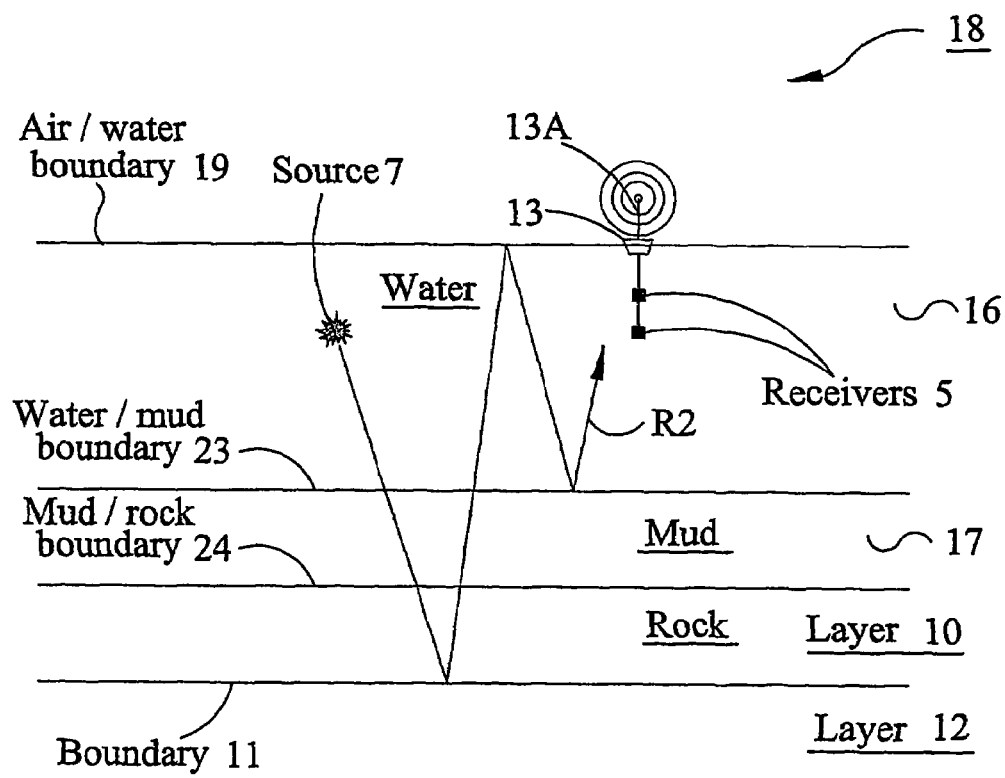
FIG. 4 illustrates a prior art transition zone VSP seismic survey at a survey location having an overlying mud layer.
Figure 5:
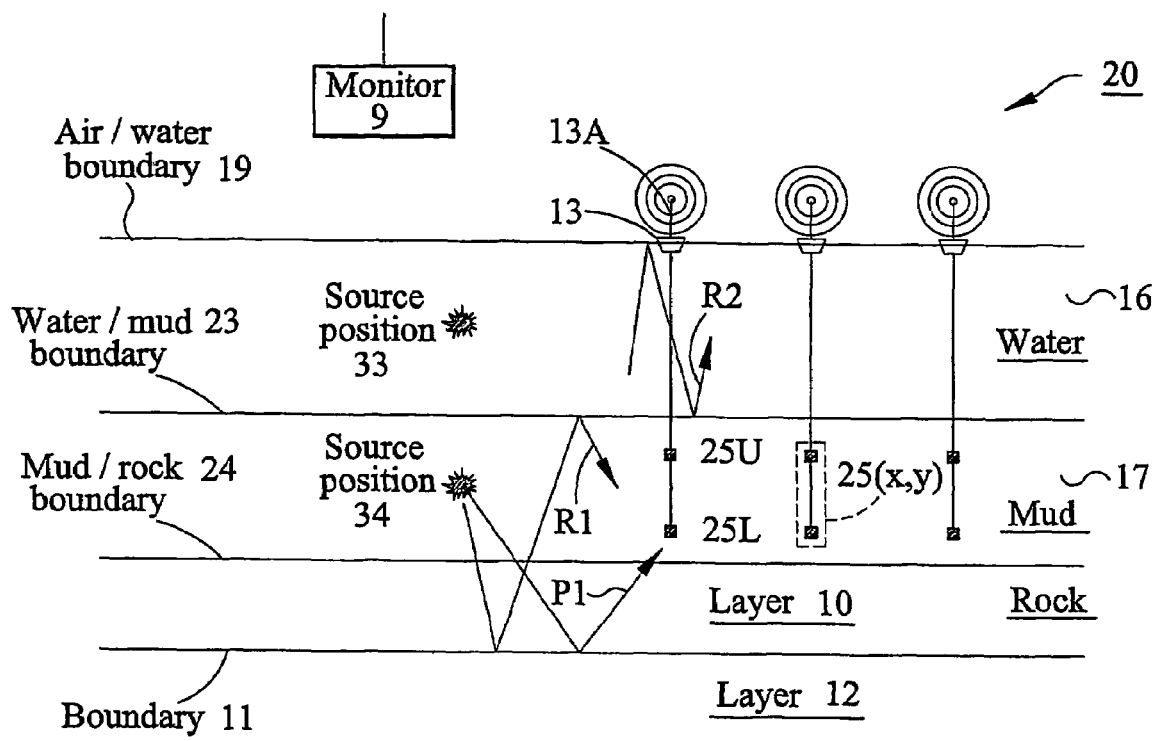
FIG. 5 is a schematic illustration of a further prior art VSP seismic survey.
Figure 6:
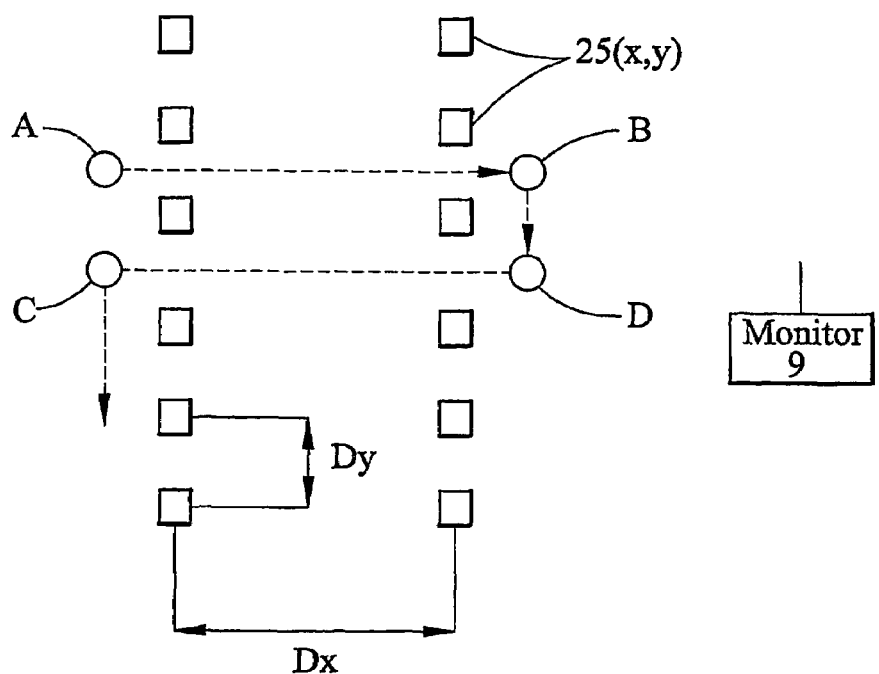
FIG. 6 is a schematic plan view of the prior art VSP seismic survey of FIG. 5.
Figure 7:
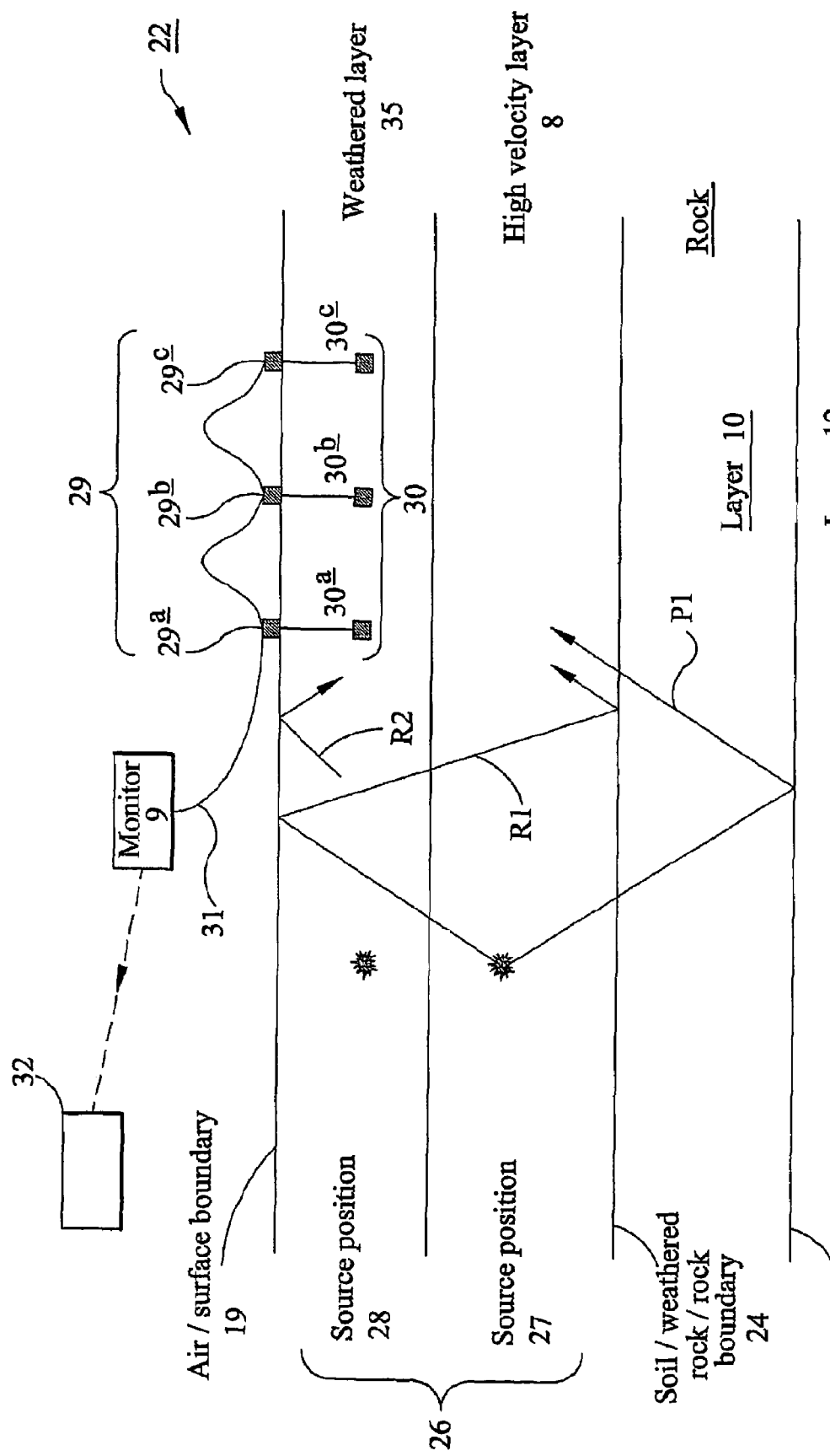
FIG. 7 is a schematic illustration of a seismic surveying arrangement according to an embodiment of the present invention.

FIG. 7 is a schematic sectional view of a seismic surveying arrangement 22 according to an embodiment of the present invention. The surveying arrangement is at a survey location at which a high velocity layer 8 of soil and weathered rock that overlies the layers 10, 11 and gives rise to reverberation is present, as is an overlying weathered layer 35. (At an actual survey location there may be more than one weathered layer overlying the high velocity layer 8, but only one weathered layer is shown in FIG. 7.)

The seismic surveying arrangement comprises a vertical source array 26 having at least two sources 27, 28 of seismic energy. Two sources are shown in FIG. 7, but the source array 26 could comprise three or more sources.

The upper source 28 of the source array 26 is disposed within the weathered layer 35. In FIG. 7 the upper source 28 is shown as disposed within the interior of the weathered layer 35, but it could be disposed at or on the upper surface 19 of the weathered layer 35 or, in principle, at the lower boundary face of the weathered layer 35.

The lower source 27 is disposed below the upper source 28. The lower source 27 may be disposed within the weathered layer 35, if this layer is deep enough to accommodate both sources, or it may alternatively be disposed at the lower boundary face of the weathered layer 35, within the high velocity layer 8 (as shown in FIG. 7), or at the lower boundary face 24 of the high velocity layer 8. (If both sources are disposed within the weathered layer 35, the upper source 28 could, for example, be disposed at the upper surface 19 of the weathered layer 35 and/or the lower source 27 could be disposed at the lower boundary face of the weathered layer 35.)

The upper source 28 and the lower source 27 are conveniently each an explosive source, but the invention is not limited to use with explosive sources.

The vertical separation between the upper source 28 and the lower source 27 is preferably at least 3 m. If the vertical source array 26 contains more than two seismic sources, the vertical separation between each two neighbouring seismic sources is preferably at least 3 m.

The upper source 28 is preferably disposed vertically above the lower source 27. However, exact verticality is not required. A lateral offset between the upper source and the lower source of up to 15 m has been found not to have significant adverse effects, although the lateral offset is preferably not more than 5 m.

The seismic surveying arrangement 22 of FIG. 7 further comprises at least one receiver array 29 disposed in the weathered layer 35. Preferably, as shown in FIG. 7, first and second horizontal receiver arrays 29, 30 are provided, but in principle only the upper receiver array 29 could be provided.

The upper receiver array 29 is disposed within the weathered layer 35. In FIG. 7 the upper receiver array 29 is shown as disposed at or on the upper surface 19 of the weathered layer 35, but the upper receiver array 29 could alternatively be disposed within the weathered layer 35 or, in principle, at the lower boundary face of the weathered layer 35.

If present, the lower receiver array 30 is disposed below the upper receiver array 29. The lower receiver array 30 may (as shown in FIG. 7) be disposed within the weathered layer 35, if this layer is deep enough to accommodate both arrays, or it may alternatively be disposed at the lower boundary face of the weathered layer 35, within the high velocity layer 8, or at the lower boundary face of the high velocity layer 8.

Each receiver 29a, 29b, 29c, 30a, 30b, 30c of the upper and lower receiver arrays comprises one or more seismic sensors. For example, each receiver might be a single-component geophone. Alternatively, each receiver could be a multi-component sensor such as, for example, a 3-component geophone.

If two receiver arrays are provided, the upper and lower receiver arrays are disposed such that at least one receiver of the lower receiver array 30 is substantially vertically below a receiver of the upper receiver array 29. (As with the sources, some lateral offset is permissible between a receiver of the upper array and the corresponding receiver of the lower receiver; a lateral offset between the upper receiver and the lower receiver of up to 15 m should not have significant adverse effects, although the lateral offset is preferably not more than 5 m.) This may conveniently be done by using two identical receiver arrays, positioned such that each receiver of the lower array 30 is substantially vertically below a corresponding receiver of the upper receiver array 29 (as shown in FIG. 7).

In principle, however, the receiver arrays do not need to be identical—for example, one receiver array could contain more receivers than the other receiver array, provided that at least one receiver of the lower receiver array 30 is substantially vertically below a receiver of the upper receiver array 29. Receivers in one receiver array that were not located substantially vertically above or below a receiver of the other receiver array could not however be used to obtain information about the reverberations within the high velocity layer 8.

If two receiver arrays are provided, the vertical separation between a receiver of the upper receiver array 29 and the corresponding receiver of the lower receiver array 30 is preferably at least 3 m. The lateral separation between two neighbouring receivers in an array is preferably at least 25 m, and is preferably less than 50 m, for both the upper and lower arrays.

In principle, one or more additional receiver arrays could be provided. If there are more than two receiver arrays, the vertical separation between each two neighbouring receiver arrays is preferably at least 3 m.

Seismic data acquired by each receiver is relayed to a monitoring and recording unit 9. Since the seismic surveying arrangement 22 is for use on dry land, the data may conveniently be relayed by means of a fixed electrical or optical link 31. However, the data may alternatively be relayed by means of a non-wired connection.

The source array 26 may be located within the earth by using a conventional rotary drill to make a vertical hole into which the sources are placed. The sources are loaded into a single hole, with filler material being located between the sources in order to ensure the desired vertical separation. Where the sources are explosive sources, a tamping material is preferably used as the filler material to prevent sympathetic detonation of the explosive charge of one source occurring when the explosive charge of a neighbouring source is fired.

The receivers of the two receiver arrays 29, 30 may similarly be positioned by drilling holes into the earth using a conventional rotary drill. Each hole is drilled to the depth at which the lower receiver array 30 is desired to be disposed, and the receivers of the lower receiver array are then inserted into the holes (one receiver into each hole). Filler material is then added to provide the desired vertical separation between the upper and lower receiver arrays. A receiver of the upper receiver array 29 is then inserted into each hole (unless the upper receiver array is to be disposed on the earth's surface, in which case the holes may be completely filled and the receivers 29a, 29b, 29c of the upper receiver array 29 disposed on the earth's surface).

In use, one of the sources of the source array is actuated to emit seismic energy, by firing it in the case of an explosive seismic source. Data is acquired at each receiver in the upper receiver array and, if provided, the lower receiver array. The acquired data are transmitted to the recording/monitoring means 9. The acquired data will contain events arising from seismic energy that has followed a primary path involving reflection at a target reflector, such as the path P1 that involves a single reflection at the interface 11 between the basement layers 10, 12. The acquired seismic data will also contain events arising from reflection at the upper boundary 19 of the weathered layer 35 (as schematically indicated by path R2 in FIG. 7) or at the lower boundary 24 of the high velocity layer 8. In addition, the acquired seismic data will also contain events arising from reverberations within the weathered layer 35 and high velocity layer 8, as indicated by the path R1.

Next, another source in the source array 26 is actuated to emit seismic energy. Seismic data are again acquired at the receivers of the upper receiver array 29 and, if provided, the lower receiver array 30.

If the source array contains more than two sources, each additional source is again actuated in sequence, and corresponding seismic data are acquired by the receivers of the upper source array 29 and, if provided, the lower receiver array 30.

The acquired seismic data are then processed to attenuate effects in the acquired seismic data arising from reverberations within the high velocity layer or from reflections at its upper or lower boundary face 19, 24. Since data are available for at least two sources, which are at different depths but at the same x- and y-co-ordinates, it is possible to perform wavefield separation on the source side. Furthermore, if the lower receiver array is present data are also available for at least two receivers which are again at different depths but at the same x- and y-co-ordinates, and it is possible to perform wavefield separation on the receiver side, as well as on the source side, on the acquired seismic data. This provides more effective attenuation of reverberations and other unwanted events than if only receiver-side separation is performed.

The monitoring and recording means 9 may contain means for processing the seismic data. Alternatively, the seismic data may be recorded, for example on optical disc or magnetic tape, by the recording means 9, and the stored data may then be transported to another location for processing. As a further alternative, the recording means 9 may transmit acquired data to a processing means either by a wired or non-wired connection.

One suitable method of processing the acquired data will now be described, with reference to FIG. 8. The method will be described with reference to data acquired using a vertical source array having sources at two depths and using receivers at two different depths.

The raw data from the various sources and receivers are collected in a conventional manner. To process the data to a meaningful seismic profile, the procedure followed in the flowchart of FIG. 8 is executed by a data processing device 32, which may comprises a programmable data processor. As noted above, the data processing device may be part of the seismic surveying arrangement 22 of FIG. 7, or it may be separate from the seismic surveying arrangement 22. If the data processing device is part of the seismic surveying arrangement 22, it may be a separate component as shown in FIG. 7 or it may be incorporated in the monitoring/recording unit 9. If the data processing device 32 is separate from the monitoring/recording unit 9, data may be transferred from the monitoring/recording unit 9 to the data processing device 32 by any suitable method, as indicated by the broken line in FIG. 7. Ways of effecting the transfer include, but are not limited to, a wired connection, a non-wired connection, and the transfer of data stored on, for example, magnetic optical disc or magnetic tape.

Figure 8:
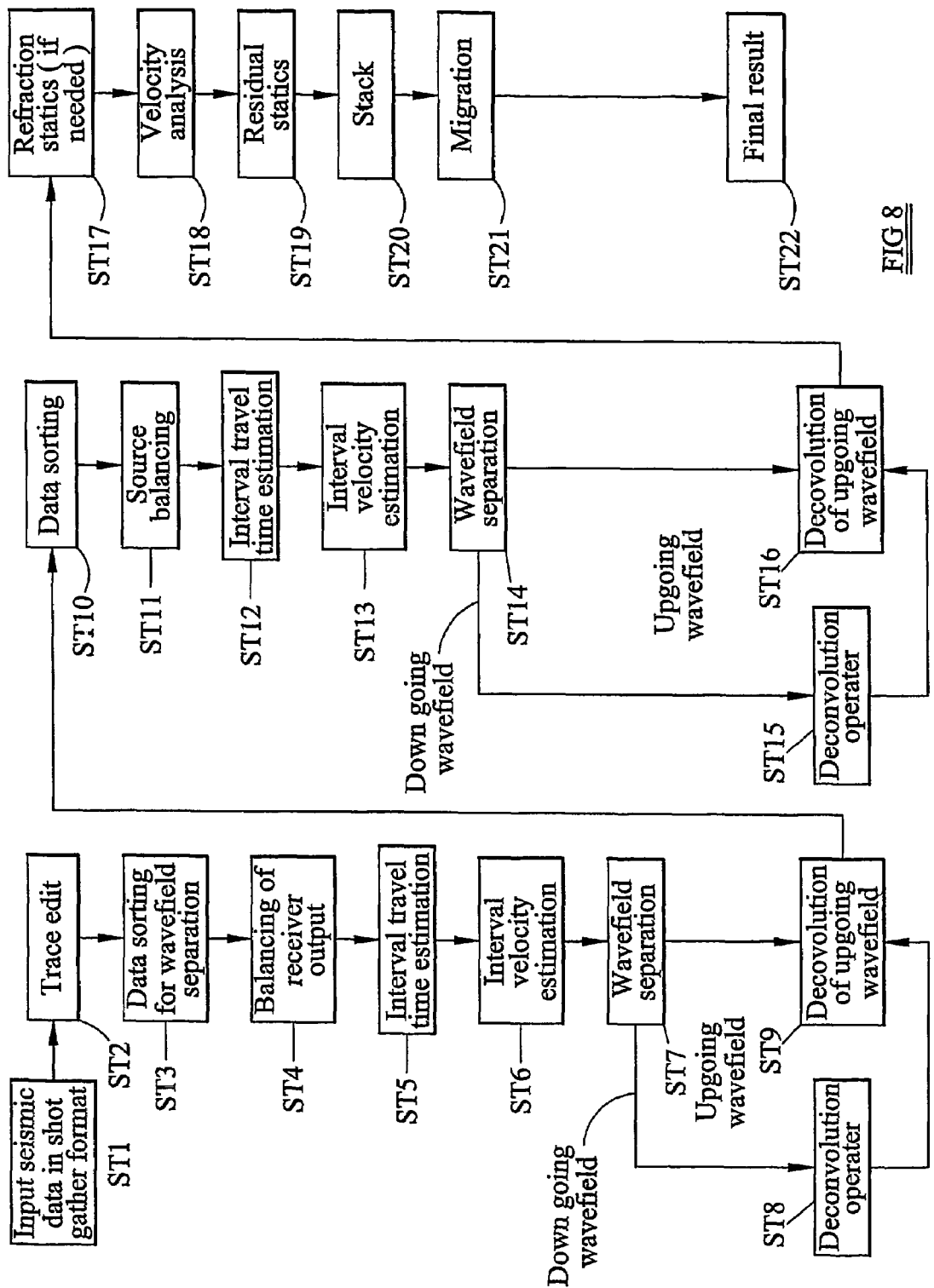
FIG. 8 is a flow chart illustrating processing of data acquired by the seismic surveying arrangement of FIG. 7.

In the method of FIG. 8, acquired seismic data are first input into the processor in step ST1. The data are read in shot gather format, i.e., trace-by-trace and shot-by-shot. The number of traces for one shot corresponds to the number of channels recorded (that is, to the number of receivers used to record the data). Then, trace editing is performed in step ST2. In this step noisy traces and shots are edited by, for example, removing spikes.

In step ST3, data is sorted for the receiver-side wave field separation. In step ST4, the receiver outputs are balanced for differences in the electrical response and coupling conditions between the upper receivers 29a-29c and the lower receivers 30a-30c. Then in step ST5, the time delay for the seismic wavefield to travel from a receiver of the lower receiver array 30 to the corresponding receiver of the upper receiver array 29 is computed using a cross-correlation technique. Based on the computed time delay and distance between the receivers, the interval velocity between a receiver of the lower receiver array 30 and the corresponding receiver of the upper receiver array 29 is statistically estimated, at step ST6.

Wavefield separation on the sensor side is achieved in step ST7. The total seismic wavefield S(z1) recorded at depth z1 (corresponding to the lower receiver array) consists of the down-going wavefield D(z1) plus the up-going wavefield U(z1) (see U.S. Pat. No. 5,581,514). That is:

$$S(z1)=D(z1)+U(z1) \quad (1)$$

Similarly, the total seismic wavefield recorded at a receiver at a depth z2 (corresponding to the upper receiver array 29) is:

$$S(z2)=D(z2)+U(z2) \quad (2)$$

The wavefield at the depth z2 is extrapolated to the depth z1 using the one way extrapolators Wu and Wd:

$$U(z1) = Wu(z1, z2)U(z2) \quad (3)$$

$$D(z1) = Wd(z1, z2)(D(z2) \quad (4)$$

where $$Wu(z1, z2) = \exp\left(-i\sqrt{k^2 - k_x^2}\,\Delta z\right) \quad (5)$$

and $$Wd(z1, z2) = \exp\left(i\sqrt{k^2 - k_x^2}\,\Delta z\right) \quad (6)$$

with $\Delta z = z1 - z2$ and with $k^2 = k_x^2 - k_z^2\left(\frac{\omega}{v}\right)^2$ where v is the velocity and ω the frequency. The separation of the up-going and down-going components of the acquired seismic data is achieved based on the following relations:

$$D(z2) = \frac{S(z1) - Wu(z1, z2)S(z2)}{Wd(z1, z2) - Wu(z1, z2)} \quad (7)$$

$$U(z2) = \frac{Wd(z1, z2)S(z2) - S(z1)}{Wd(z1, z2) - Wu(z1, z2)} \quad (8)$$

In step ST8, a deconvolution operator is computed for the down-going wavefield, and this is applied to the up-going wavefield at step ST9.

In step ST10, the data is sorted into shot gathers based on shot location (x,y) with adjacent traces from the upper and lower sources. In step ST11 the source outputs are balanced to account for difference in coupling between the upper source and the lower source. Step ST11 may also correct for differences in charge sizes, if the upper and lower sources used had have different charge sizes. In step ST12 the travel-time difference between the upper source and the lower source is estimated as in step ST5. In step ST13, the interval velocity is estimated, as in step ST6. In step ST14 wave field separation is achieved by removing the up-going wavefield at the source side, as in step ST8. The up-going wavefield at the source side is the delayed wavefield and is the down-going wavefield on the sensor side. (On the source side the same process is used as for the receivers—the upper source is equivalent to the upper receiver, and the lower source is equivalent to the lower receiver.)

In step ST15 a deconvolution operator is designed for the up-going wavefield on the source side and this is applied to the down-going wavefield on the source side at step ST16.

In step ST17, a refraction static correction computation is performed when necessary. To do this, the first arrivals are picked and, based on these, a model of the high velocity layer 8 is derived. This step estimates the static shift required to correct for the different seismic velocity in the high velocity layer. Furthermore, owing to the nature of refraction statics this step will probably correct for the time delay in the weathered layer overlying the high velocity layer. The shot-receiver pair static corrections are estimated from this model and are then applied to each trace, to correct the arrival time of each event for the different velocity in the layer 8.

In step ST18, the data are sorted in common midpoint gathers and the stacking velocities are computed and applied to each trace. Residual static corrections are then computed for each source and sensor set (step ST19). This can be done in multiple iterations until an optimum solution is found. The residual static corrections are applied to each seismic trace. Subsequently, the seismic traces which belong to the same common midpoint position are stacked together using the diversity stack method (step ST20) and the stacked traces are migrated to their proper space and time using a wave equation migration algorithm (step ST21). The migrated section is then properly filtered, normalised, and displayed as the final result.

As noted, the above method requires seismic data acquired using a vertical source array having sources at two depths and using receivers at two different depths. It may however be readily be adapted for use with data acquired using a source array having sources at more than two depths and/or using receivers at only one depth or at more than two different depths. In particular, if data is available only for receivers at one depth (i.e., if the data were acquired using a seismic surveying arrangement having only one horizontal receiver array), the receiver-side wavefield separation steps cannot be carried out. While it is straightforward to provide a vertical source array, since this requires drilling only one hole, it is sometimes more difficult to bury an entire receiver array. There may well therefore be cases where data are available only for receivers at one depth (probably for receivers on the earth's surface), but for sources at two different depths. The acquisition and processing steps for such data are the same as described above, except that the steps relating to receiver-side wavefield separation must be omitted.

One test data set to which the invention was applied was for a coal exploration target with relatively short offsets (less than 400 m). A major portion of the seismic signal is buried under groundroll/reverberations from the uppermost layers. Even where data for receivers at only one depth was available, elimination of only the source reverberations produced an improvement in the data quality.

The invention claimed is:

1. A seismic surveying arrangement comprising:
   a vertical source array having at least two sources of seismic energy and disposed such that a first source is located within a weathered layer of the earth's interior and such that a second source is located within the weathered layer at a greater depth than the first source;
   a first horizontal receiver array located in the weathered layer;
   a second horizontal receiver array located within a high velocity layer underlying the weathered layer, wherein at least one receiver of the second receiver array is disposed substantially vertically below a receiver of the first receiver array; and
   means for processing seismic data acquired by the first receiver array in consequence of emission of seismic energy by the source array so as to attenuate in the acquired seismic data seismic events involving reflection of seismic energy at at least one boundary face of a high velocity layer underlying the weathered layer.

2. A seismic surveying arrangement as claimed in claim 1 wherein the vertical source array comprises exactly two seismic sources.

3. A seismic surveying arrangement as claimed in claim 2 wherein the vertical spacing between one source of the array and the other source of the array is at least 3 m.

4. A seismic surveying arrangement as claimed in claim 1 wherein the vertical source array comprises more than two seismic sources.

5. A seismic surveying arrangement as claimed in claim 1 wherein the uppermost seismic source of the vertical source array is disposed substantially at an upper boundary face of the weathered layer.

6. A seismic surveying arrangement as claimed in claim 1 wherein the receiver array comprises two or more laterally spaced receivers.

7. A seismic surveying arrangement as claimed in claim 6 wherein, for each pair of immediately adjacent receivers in the first or second receiver array, the horizontal spacing between a receiver and an immediately adjacent receiver in an array is at least 25 m.

8. A seismic surveying arrangement as claimed in claim 6 wherein for each pair of immediately adjacent receivers in the first or second receiver array, the horizontal spacing between a receiver and an immediately adjacent receiver in an array is less than 50 m.

9. A seismic surveying arrangement as claimed in claim 1, wherein the first receiver array is disposed substantially at an upper boundary face of the weathered layer.

10. A seismic surveying arrangement as claimed in claim 1 wherein the weathered layer is the uppermost layer of the earth's interior.

11. A seismic surveying arrangement as claimed in claim 1 wherein the processing means comprises a programmable data processor.

12. The seismic surveying arrangement of claim 1, wherein the second source is located at a lower boundary surface of the weathered layer.

13. A method of processing seismic data comprising the steps of:
    acquiring seismic data using a seismic surveying arrangement having:
      a vertical source array having at least two sources of seismic energy and disposed such that a first source is located within a weathered layer of the earth's interior and such that a second source is located within the weathered layer at a greater depth than the first source;
      a first horizontal receiver array located in the weathered layer;
      a second horizontal receiver array located within a high velocity layer underlying the weathered layer, wherein at least one receiver of the second receiver array is disposed substantially vertically below a receiver of the first receiver array; and
      means for processing seismic data acquired by the first receiver array in consequence of emission of seismic energy by the source array so as to attenuate in the acquired seismic data seismic events involving reflection of seismic energy at at least one boundary face of a high velocity layer underlying the weathered layer; and
    processing seismic data acquired by the receiver array thereby to attenuate seismic events involving reflection of seismic energy at at least one boundary face of the high velocity layer.

14. A method as claimed in claim 13, wherein the step of processing the seismic data comprises separating the acquired data into up-going and down-going components on the receiver side.

15. A method as claimed in claim 14 and further comprising separating the acquired data into up-going and down-going components on the source side.

16. A seismic surveying arrangement comprising:
    a vertical source array having at least two sources of seismic energy and disposed such that a first source is located within a weathered layer of the earth's interior and such that a second source is located within a high velocity layer underlying the weathered layer;

a first horizontal receiver array located within the weathered layer, wherein the first horizontal receiver array is configured to acquire seismic data; and a second horizontal receiver array located within the high velocity layer, means for attenuating in the acquired seismic data seismic events involving reflection of seismic energy at at least one boundary face of the high velocity layer.

17. The seismic surveying arrangement of claim 16, further comprising a second horizontal receiver array located within weathered layer at a greater depth than the first horizontal receiver array.

* * * * *